US012550100B2

(12) United States Patent
Ryan

(10) Patent No.: US 12,550,100 B2
(45) Date of Patent: Feb. 10, 2026

(54) SYNCHRONIZING RADIO COMMUNICATIONS

(71) Applicant: Nordic Semiconductor ASA, Trondheim (NO)

(72) Inventor: Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 538 days.

(21) Appl. No.: 17/885,399

(22) Filed: Aug. 10, 2022

(65) Prior Publication Data

US 2023/0070483 A1   Mar. 9, 2023

(30) Foreign Application Priority Data

Aug. 11, 2021 (GB) ...................... 2111543

(51) Int. Cl.
*H04W 56/00* (2009.01)
*H04W 64/00* (2009.01)

(52) U.S. Cl.
CPC ....... *H04W 64/00* (2013.01); *H04W 56/0045* (2013.01); *H04W 56/009* (2013.01)

(58) Field of Classification Search
CPC ....... H04W 4/02; H04W 4/023; H04W 4/025; H04W 4/029; H04W 56/00; H04W 56/001; H04W 56/0035; H04W 56/04; H04W 56/0045; H04W 56/0055; H04W 56/0065; H04W 56/009; H04W 56/0095; H04W 64/00; H04W 64/003; H04W 64/006
See application file for complete search history.

(56) References Cited

U.S. PATENT DOCUMENTS

| | | | |
|---|---|---|---|
| 9,277,372 B2* | 3/2016 | Lohmar | ................. H04W 72/30 |
| 10,911,211 B1* | 2/2021 | Kratz | ..................... H04B 17/21 |

(Continued)

FOREIGN PATENT DOCUMENTS

GB    1 275 984    11/1969

OTHER PUBLICATIONS

IPO Examination Report under Section 18(3) for Great Britain Application No. 2111543.1, dated Nov. 27, 2023, 6 pages.

(Continued)

*Primary Examiner* — Matthew W Genack
(74) *Attorney, Agent, or Firm* — Klarquist Sparkman, LLP

(57) ABSTRACT

A system for synchronizing communications in a radio ranging process involves transmitting calibration signals according to a predetermined schedule of nominal transmission times. Timing offsets are determined. A start time is determined for a transmission of a ranging signal. The start time is earlier than a nominal start time of the ranging signal by at least the largest timing offset. Another system for synchronization involves a radio device transmitting a calibration signal to a second radio device and receiving a calibration response signal from the second radio device. A time-of-flight value is determined in dependence on a time of departure of the calibration signal and a time of arrival of the calibration response signal. A ranging signal is transmitted at a time determined in dependence on the determined time-of-flight value. A ranging response signal is received and processed to determine a range value.

19 Claims, 4 Drawing Sheets

(56) References Cited

U.S. PATENT DOCUMENTS

| | | | |
|---|---|---|---|
| 2010/0202354 A1* | 8/2010 | Ho | H04B 13/005 |
| | | | 370/328 |
| 2010/0245050 A1* | 9/2010 | Shiotsu | G01S 13/82 |
| | | | 340/10.3 |
| 2012/0032855 A1 | 2/2012 | Reede et al. | |
| 2014/0148195 A1 | 5/2014 | Bassan-Eskenazi et al. | |
| 2014/0370912 A1 | 12/2014 | Kurby et al. | |
| 2016/0088497 A1 | 3/2016 | Segev et al. | |
| 2016/0261306 A1 | 9/2016 | Seller et al. | |
| 2017/0289946 A1 | 10/2017 | Aldana | |
| 2019/0370571 A1* | 12/2019 | Shin | H04L 67/63 |
| 2020/0053691 A1 | 2/2020 | Seth et al. | |
| 2020/0169939 A1 | 5/2020 | McIlroy | |
| 2020/0249335 A1 | 8/2020 | Eggert | |
| 2021/0103046 A1 | 4/2021 | Waheed et al. | |
| 2022/0038849 A1* | 2/2022 | Speidel | H04L 27/26885 |

OTHER PUBLICATIONS

IPO Combined Search and Examination Report dated Aug. 23, 2022, from GB Patent Application No. 2111543.1, 6 pp.

IPO Combined Search and Examination Report under Sections 17 and 18(3) for GB 2111543.1, dated May 3, 2022, 13 pages.

* cited by examiner

SYNCHRONIZING RADIO COMMUNICATIONS

CROSS-REFERENCE TO RELATED APPLICATION

This application claims priority from Great Britain Application No. 2111543.1, filed on Aug. 11, 2021, which application is incorporated herein by reference in its entirety.

BACKGROUND

This invention relates to methods, apparatus and software for synchronizing communications in a radio ranging process.

Certain radio devices are capable of implementing ranging processes to measure the separation distance between a pair of such devices. Such ranging may be based on time-of-flight or may be multicarrier phase-based.

In a phase-based ranging process, unmodulated radio carrier signals (i.e. pure sine-wave tones), are transmitted between two radio transceiver devices, over a number of different frequencies. The device receiving a signal measures a phase offset between the signal and a locally-generated reference signal. By transmitting unmodulated signals in both directions, and on two or more different frequencies, it can be possible to collect sufficient phase-offset measurements to be able to generate accurate estimates of the distance between the respective antennae of the devices.

When the devices are not synchronized, the frequencies of the unmodulated carrier signals they transmit may not be perfectly aligned. In order to adjust for this, one of the transceiver devices can estimate a fractional frequency offset (FFO) of its local oscillator relative to a local oscillator of the other device, by processing one or more unmodulated carrier signals received from the other device. This may be done during a calibration stage, before further unmodulated carrier signals are exchanged as part of a ranging stage.

In time-of-flight ranging, the separation distance is calculated from time-of-departure (ToD) and time-of-arrival (ToA) measurements of modulated signals. By modulating a carrier wave with a predetermined sequence, a receiving device can determine an accurate time of arrival, e.g. using a signal correlator. Radio waves travel through media such as air, space and water at speeds that are relatively constant and precisely known. Therefore the time it takes a radio signal to travel from a transmitter device to a receiver device corresponds to the separation distance between the devices. If the devices have accurately synchronized clocks, a single one-way transmission may be sufficient to determine a distance between them. However, in many situations, radio devices do not have synchronized clocks. Round-trip timing (RTT) can nevertheless be used to determine the separation distance between two digital radio transceivers, even when the devices are not synchronized to a common time reference.

RTT ranging is based on determining the time taken for a first timing signal to travel from a device A (an "initiator") to a device B (a "reflector") plus the time taken for a second timing signal, sent by device B in response, to travel from device B to device A. If device A knows the time interval from device B receiving the first signal and transmitting the second signal (the "dwell time" of device B), then device A can calculate an average time of flight (ToF) over the two transmission directions by subtracting the dwell time from the difference between the ToD of the first signal (measured according to a clock of device A) and the ToA of the second signal (also measured according to the clock of device A), and dividing by two.

Some radio devices may support both phase-based and RTT ranging, and may be able to use either when engaging in a ranging process with another radio device, depending on the capabilities of the other device. Such a device may be able to transmit a ranging data packet, for use in a ranging process, that contains both an unmodulated carrier-wave signal portion and a modulated timing signal portion (e.g. a phase- or frequency-modulated predefined synchronization sequence).

The accuracy of both phase-based and RTT ranging can be improved by repeating ranging steps multiple times within one ranging event (i.e. performing multiple rounds), and averaging the distance estimates obtained from the different steps.

Radio devices may deactivate some or all of their radio receive circuitry when they are not expecting to receive a radio signal from a peer device. This may, for example, be because they only support half-duplex communication, or to reduce power consumption. It can be beneficial for radio devices to synchronize their communications, in a ranging process, so that each device starts and ends receive windows at predetermined times that correspond to times at which the peer device will be transmitting.

However, it is not straightforward to implement such scheduling in a way that results in reliable and efficient communication.

Embodiments of the present invention seek to provide improved approaches to synchronizing communications in a radio ranging process.

SUMMARY

From a first aspect, the invention provides a method for synchronizing communications in a radio ranging process, the method comprising:
- transmitting a succession of calibration signals to a first radio device from a second radio device according to a predetermined schedule of nominal transmission times;
- determining a set of timing offsets, wherein each timing offset is determined in dependence on i) a time of arrival at the first radio device of a respective calibration signal of the succession of calibration signals, and ii) the nominal transmission time for the calibration signal;
- determining a start time for a transmission of an unmodulated-carrier ranging signal by the first radio device, by processing the set of timing offsets and data representative of a nominal start time for the transmission of the unmodulated-carrier ranging signal to determine a start time for the transmission that is earlier than the nominal start time by at least a largest timing offset in the set of timing offsets; and
- transmitting the unmodulated-carrier ranging signal from the first radio device at the determined start time.

From a second aspect, the invention provides a radio device configured to:
- receive a succession of calibration signals transmitted to the radio device, according to a predetermined schedule of nominal transmission times, by a second radio device;
- determine a set of timing offsets, wherein each timing offset is determined in dependence on i) a time of arrival at the radio device of a respective calibration signal of the succession of calibration signals, and ii) the nominal transmission time for the calibration signal;

determine a start time for a transmission of an unmodulated-carrier ranging signal by the radio device, by processing the set of timing offsets and data representative of a nominal start time for the transmission of the unmodulated-carrier ranging signal to determine a start time for the transmission that is earlier than the nominal start time by at least a largest timing offset in the set of timing offsets; and transmit the unmodulated-carrier ranging signal at the determined start time.

From a third aspect, the invention provides a radio ranging system comprising a first radio device and a second radio device, wherein the first radio device is configured to:

receive a succession of calibration signals transmitted to the first radio device, according to a predetermined schedule of nominal transmission times, by the second radio device;

determine a set of timing offsets, wherein each timing offset is determined in dependence on i) a time of arrival at the first radio device of a respective calibration signal of the succession of calibration signals, and ii) the nominal transmission time for the calibration signal;

determine a start time for a transmission of an unmodulated-carrier ranging signal by the first radio device, by processing the set of timing offsets and data representative of a nominal start time for the transmission of the unmodulated-carrier ranging signal to determine a start time for the transmission that is earlier than the nominal start time by at least a largest timing offset in the set of timing offsets; and transmit the unmodulated-carrier ranging signal at the determined start time.

From a fourth aspect, the invention provides software comprising instructions which, when executed by a processor of a radio device, cause the processor to:

determine a set of timing offsets, wherein each timing offset is determined in dependence on i) a time of arrival at the radio device of a respective calibration signal of a succession of calibration signals transmitted by a second radio device according to a predetermined schedule of nominal transmission times, and ii) the nominal transmission time for the calibration signal;

determine a start time for a transmission of an unmodulated-carrier ranging signal by the radio device, by processing the set of timing offsets and data representative of a nominal start time for the transmission of the unmodulated-carrier ranging signal to determine a start time for the transmission that is earlier than the nominal start time by at least a largest timing offset in the set of timing offsets; and cause the radio device to transmit the unmodulated-carrier ranging signal at the determined start time.

Thus it will be seen that the first radio device adjusts the start time for transmitting an unmodulated-carrier ranging signal (i.e. a sine wave) based on the actual times of arrival a plurality of received calibration signals. This can allow the first radio device to start transmitting the unmodulated carrier cautiously early, assuming a "worst case" scenario for transmission delays and/or timing errors (which may arise due to non-ideal components in the devices, multipath reflections, etc.), thereby increasing the likelihood of the second radio device receiving the unmodulated carrier from the very start of a receive window opened by the second radio device. This can help to ensure the second radio device receives sufficiently much of the unmodulated carrier as to be able to perform a reliable phase-based ranging process.

By considering a plurality of calibration signals, rather than just a single calibration signal, this approach can advantageously take account for any timing jitter or other variations that may occur over the course of the calibration stage.

The predetermined schedule of nominal transmission times may be defined by a specification or standard. The data representative of a nominal start time for the transmission of the unmodulated-carrier ranging signal may accord with the schedule. The schedule may specify a nominal duration or nominal end time for each calibration signal. The schedule may specify a nominal carrier frequency for the unmodulated-carrier ranging signal. It may specify nominal start times and/or nominal durations and/or nominal end times and/or carrier frequencies for a plurality of unmodulated-carrier ranging signal within a ranging process. Data representative of part or all of the schedule may be stored in a memory of the first radio device and/or in a memory of the second radio device.

In some embodiments, the first radio device may also end the transmission of the unmodulated-carrier ranging signal cautiously late, by transmitting the ranging signal for longer than a nominal duration specified by the schedule. This can further increase the likelihood of the second radio device receiving sufficiently much of the unmodulated carrier as to be able to perform a reliable phase-based ranging process. The first radio device may be configured to determine an end time for the transmission of the unmodulated-carrier ranging signal by the first radio device, by processing the set of timing offsets and data representative of a nominal end time for the transmission of the unmodulated-carrier ranging signal to determine an end time for the transmission that is not earlier than the nominal end time by more than a smallest timing offset in the set of timing offsets. It may still cease transmitting before the nominal end time (e.g. to improve spectral efficiency or to reduce power consumption) if the smallest timing offset is positive, but by an amount determined by considering a plurality of calibration signals, rather than just a single calibration signal, and which can therefore take account of timing jitter or other variations. However, in other embodiments, the first radio device could be configured to end the transmission at a time that depends on one or more fixed adjustment values, rather than calculating the end time from the set of timing offsets (e.g. assuming a "worst case" scenario for timing parameters); this can reduce the processing load on the first radio device.

The first radio device may transmit the unmodulated-carrier ranging signal continuously between the determined start time and a determined end time. It preferably starts the transmission at the determined start time (rather than starting before this time), and preferably ends (i.e. ceases) the transmission at a determined end time (rather than ending after this time).

The start time and/or end time may be determined according to a clock of the first radio device. The first radio device may be configured to compensate for an internal delay within radio transmission circuitry of the first radio device. It may control radio transmission circuitry such that the start and/or end times relate to when the unmodulated-carrier ranging signal is emitted, as a radio signal, from an antenna of the radio device.

In some embodiments, the calibration signal is or comprises a modulated signal. It may be modulated with a predetermined synchronization sequence. The second radio device may comprise a hardware or software correlator or symbol detector for processing data representative of the received calibration signal to determine a time of arrival of the signal. It may comprise hardware circuitry or software configured to perform a symbol-wise detection algorithm such as the Gardner algorithm.

The unmodulated-carrier ranging signal may be used (e.g. in conjunction with one or more further unmodulated-carrier ranging signals) to determine a range value representative of a distance between the first radio device and the second radio device. It may be received by the second radio device and processed (e.g. by the second radio device) to determine such a range value. The range value may be determined from a plurality of unmodulated-carrier ranging signals, preferably including two or more different carrier frequencies. Each individual unmodulated-carrier ranging signal may be processed to determine a respective phase and magnitude value (e.g. represented by a complex number). A plurality of such phase and magnitude values may be processed to determine the range value.

The first radio device may determine a respective start time for each of a succession of transmissions of unmodulated-carrier ranging signals by the first radio device. It may do so by processing the set of timing offsets and data representative of a respective nominal start time for the transmission of each unmodulated-carrier ranging signal to determine a start time for each transmission that is earlier than the respective nominal start time by at least a largest timing offset in the set of timing offsets. It may transmit the succession of unmodulated-carrier ranging signals at the determined start times. The succession of transmissions may be received by the second radio device and used (e.g. processed) to determine a range value representative of a distance between the first radio device and the second radio device (e.g. by averaging a plurality of respective range values determined from each of the ranging signals).

Each unmodulated-carrier ranging signal may be contained in a respective radio packet which may also contain a modulated signal.

Each timing offset may be determined as a predetermined function of at least i) a time of arrival of a respective calibration signal, and ii) the nominal transmission time for the calibration signal. Each timing offset may be determined in dependence on a difference between i) a time of arrival of a respective calibration signal, and ii) the nominal transmission time for the calibration signal. The first radio device may be configured to subtract the nominal transmission time for each calibration signal from the time of arrival of the respective calibration signal.

The start time for the ranging signal may be determined as a predetermined function of at least the nominal start time and a largest timing offset in the set of timing offsets. It may also be determined in dependence on a fractional frequency offset (FFO) factor. The nominal start time may, in some embodiments, be scaled in dependence on the fractional-frequency-offset factor (e.g. being divided by one plus the FFO factor, optionally plus a tolerance factor). The fractional-frequency-offset factor may be a predetermined constant value (e.g. fixed in accordance with a maximum tolerance set in a device specification), or it may be calculated by the system, e.g. as an estimate of a relative frequency offset between the first and second devices. It may be estimated from one or more radio signals exchanged by the radio devices. It may be determined as the largest positive value from a plurality of fractional frequency offset measurements determined from respective calibration signals. The nominal start time may, additionally or alternatively, be scaled by a constant fractional-frequency-offset tolerance factor.

In some embodiments, the first radio device may be configured to subtract the largest timing offset from the nominal start time. It may, in some embodiments, further subtract a constant timing jitter value.

The end time for the ranging signal may be determined in dependence on a fractional frequency offset factor. A nominal end time may, in some embodiments, be scaled in dependence on a fractional-frequency-offset factor, which may be determined as the largest negative value from a plurality of fractional frequency offset measurements determined from respective calibration signals (e.g. being divided by one minus the FFO factor, optionally minus a tolerance factor).

In some embodiments, the first radio device may be a reflector device. The second radio device may be an initiator device. The first radio device may be configured to transmit a ranging response signal in response to receiving a ranging signal from the second radio device. It may be configured to do so after a predetermined dwell time. The unmodulated-carrier ranging signal(s) may be ranging response signals, which may be transmitted in response to ranging signals received by the first radio device from the second radio device.

In some embodiments, the first radio device may be an initiator device and the second radio device may be a reflector device. The unmodulated-carrier ranging signal(s) may be ranging signals, to which the second radio device may respond with ranging response signals. The second radio device may be configured to transmit a ranging response signal in response to receiving a ranging signal from the first radio device. In such embodiments, each timing offset may be determined as a predetermined function of at least i) a time of arrival of a respective calibration signal at the first (initiator) radio device, ii) the nominal transmission time for the calibration signal, and iii) a time-of-flight value, which may be determined at least in part from the time or times of arrival of one or more of the calibration signals at the first (initiator) radio device.

In some embodiments, the second (e.g. reflector) radio device may be further configured to:
  receive a succession of calibration signals transmitted to the second radio device, according to a predetermined schedule of nominal transmission times, by the first (e.g. initiator) radio device;
  determine a set of timing offsets, wherein each timing offset is determined in dependence on i) a time of arrival at the second radio device of a respective calibration signal of the succession of calibration signals, and ii) the nominal transmission time for the calibration signal;
  determine a start time for a transmission of an unmodulated-carrier ranging signal by the second radio device, by processing the set of timing offsets and data representative of a nominal start time for the transmission of the unmodulated-carrier ranging signal to determine a start time for the transmission that is earlier than the nominal start time by at least a largest time timing offset in the set of time timing offsets; and
  transmit the unmodulated-carrier ranging signal at the determined start time.

Thus both the initiator and the reflector may, in some embodiments, be configured to adjust their transmission times according to principles disclosed herein.

The succession of calibration signals may be transmitted in a calibration stage. The unmodulated-carrier ranging signal may be transmitted in a ranging stage. One or more further unmodulated-carrier ranging signals may also be transmitted in the ranging stage. The calibration stage may precede the ranging stage within a ranging process.

Widening the transmission time for the ranging signal or signals may be preferable to narrowing the corresponding reception window at the peer device. This can be beneficial because it can be easier to test devices, e.g. for conformity to a specification in interoperability testing, by monitoring the radio transmissions from the device than by attempting to analyse the receive windows of a device.

However, in some embodiments, one or both devices may also adjust their receive windows. For instance, in some embodiments, the first radio device may be further configured to undersize a receive window for an incoming ranging signal from the second radio device. This may be done with confidence (i.e. without risking not receiving a sufficient duration of the ranging signal) if it is known that the second radio device is implementing widened transmissions, as disclosed herein. The first radio device may be configured to use the set of timing offsets to determine a start time for receiving the ranging signal from data representative of a predetermined nominal start time for a reception of a ranging signal. The nominal reception start time may equal the nominal transmission time for the ranging signal (i.e. assuming zero transmission delay). The first radio device may open a receive window at a time that is later than the predetermined nominal start time by at least the largest (i.e. latest) timing offset in the set of timing offsets. It may further use the set of timing offsets to determine an end time for the receiving the ranging signal from data representative of a predetermined nominal end time for the reception of the ranging signal (which may be the nominal transmission end time). The first radio device may close its receive window earlier than the predetermined nominal end time by at least the largest (i.e. earliest) timing offset in the set of timing offsets. It may enable radio receive circuitry in the first radio device, for receiving a ranging signal, continuously between the determined start time and the determined end time.

In some embodiments, the first or second radio device may be further configured to determine a time-of-flight value in dependence on a time of departure of a calibration signal by the device and a time of arrival of a calibration response signal. It may transmit a ranging signal at a time determined in dependence on the determined time-of-flight value. It may receive a ranging response signal and may process the ranging response signal to determine a range value representative of a distance between the initiator device and the reflector device.

In this way, an initiator device may be able to determine a first (e.g. relatively coarse) time-of-flight (ToF) range estimate during a calibration stage of a ranging process, and then use this to synchronize the start and/or end times of one or more ranging signals, for determining a second (e.g. more precise) range estimate, in a ranging stage of the ranging process. The ranging signals may be or comprise modulated signals and the second range estimate may be determined using time-of-flight ranging (e.g. RTT ranging). However, in a preferred set of embodiments, the ranging signals may be or comprise unmodulated carrier signals and the second range estimate may be determined using phase-based ranging. This may, in general, enable a more accurate range estimate to be determined than when using RTT ranging.

This principle may be used advantageously without necessarily processing a set of timing offsets as disclosed above.

Thus, from a further aspect, the invention provides a method for synchronizing communications in a radio ranging process, the method comprising:
  a first radio device transmitting a calibration signal to a second radio device;
  the second radio device receiving the calibration signal and, in response, transmitting a calibration response signal;
  the first radio device determining a time-of-flight value in dependence on a time of departure of the calibration signal and a time of arrival of the calibration response signal;
  the first radio device transmitting a ranging signal at a time determined in dependence on the determined time-of-flight value;
  the second radio device receiving the ranging signal and, in response, transmitting a ranging response signal; and
  the first radio device processing the ranging response signal to determine a range value representative of a distance between the first radio device and the second radio device.

From a further aspect, the invention provides a radio device configured to:
  transmit a calibration signal to a second radio device;
  receive a calibration response signal from the second radio device;
  determine a time-of-flight value in dependence on a time of departure of the calibration signal and a time of arrival of the calibration response signal;
  transmit a ranging signal to the second radio device at a time determined in dependence on the determined time-of-flight value;
  receive a ranging response signal from the second radio device; and
  process the ranging response signal to determine a range value representative of a distance between the first radio device and the second radio device.

From a further aspect, the invention provides a radio ranging system comprising a first radio device and a second radio device, wherein the first radio device is configured to:
  transmit a calibration signal to the second radio device;
  receive a calibration response signal from the second radio device;
  determine a time-of-flight value in dependence on a time of departure of the calibration signal and a time of arrival of the calibration response signal;
  transmit a ranging signal to the second radio device at a time determined in dependence on the determined time-of-flight value;
  receive a ranging response signal from the second radio device; and
  process the ranging response signal to determine a range value representative of a distance between the first radio device and the second radio device.

From a further aspect, the invention provides software comprising instructions which, when executed by a processor of a radio device, cause the processor to:
  cause the radio device to transmit a calibration signal to a second radio device;
  determine a time-of-flight value in dependence on a time of departure of the calibration signal and a time of arrival of a calibration response signal received by the radio device from the second radio device;
  cause the radio device to transmit a ranging signal to the second radio device at a time determined in dependence on the determined time-of-flight value; and process a ranging response signal received by the radio device from the second radio device to determine a range value representative of a distance between the device and the second radio device.

Any feature of any preceding aspect or embodiments may be a feature of embodiments of these aspects also, and vice versa.

In any of the aspects disclosed herein, the or each device may be a respective radio transceiver device. Each may comprise one or more radio antennae. Each device may be all or a part of: a radio tag, a sensor device, a cell-phone, a personal computing device, a domestic appliance, a vehicle, or any other device. The devices may be separated by any distance. Depending on their communication range, the separation distance could be in the order of centimetres, metres, kilometres, tens of kilometres or more. In some embodiments, the devices are respective short-range range devices. They may comprise respective Bluetooth™ Low Energy radio devices. They may support a current or future version of the Bluetooth™ Low Energy specification. The transmitted radio messages and signals may be in a 2.4 GHz band.

Each device may comprise or may be an integrated-circuit radio transceiver—e.g., a silicon chip. Each device may comprise, or be connectable to, one or more off-chip components, such as a power supply, antenna, crystal, discrete capacitors, discrete resistors, etc.

The first radio device or the reflector device may further be configured for performing any of the steps disclosed herein as being performed by a second radio device or by an initiator device. It may thus act as an initiator in a first instance of a ranging method as disclosed herein, and as a reflector in a second instance of a ranging method as disclosed herein (e.g. at a later time). Similarly, the second radio device or the initiator device may further be configured for performing any of the steps disclosed herein as being performed by a first radio device or by an reflector device.

Each device may comprise one or more processors, DSPs, logic gates, amplifiers, filters, digital components, analog components, non-volatile memories (e.g., for storing software instructions), volatile memories, memory buses, peripherals, inputs, outputs, and any other relevant electronic components or features.

Each device may comprise a memory storing software instructions for execution by a processing system of the device. The software instructions may instruct the device for performing any of the steps or operations disclosed herein. Each device may comprise a DSP and/or a general purpose processor, such an Arm™ Cortex-M™ processor. Any of the processing steps disclosed herein may be performed wholly in software, or wholly by hardwired circuitry (e.g., comprising digital logic gates), or by a combination or software and hardware.

Computer software as disclosed herein may be provided on a non-transitory computer readable medium.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
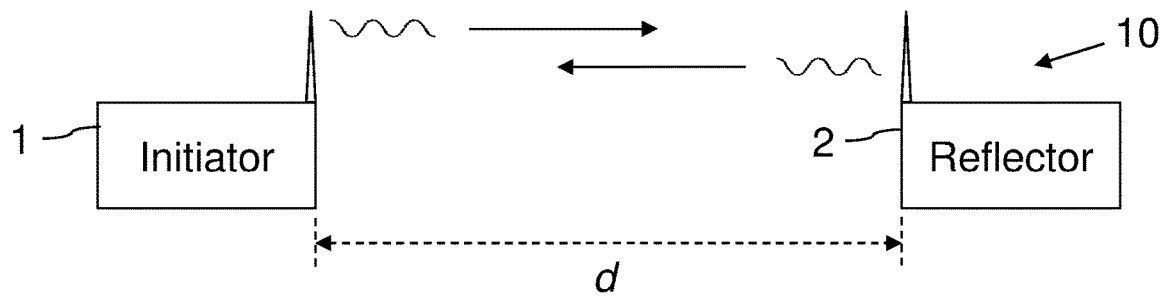
FIG. 1 is a schematic diagram of a radio system for performing a ranging process embodying the invention.

FIG. 1 shows a first radio transceiver device 1 (embodying a "second radio device" as disclosed herein) and a second radio transceiver device 2 (embodying a "first radio device" as disclosed herein), configured to act as an "initiator" transceiver and a "reflector" transceiver, respectively, in a ranging process (also referred to herein as a ranging event) for estimating a separation distance, d, between the devices 1, 2. This distance could be of the order of centimetres, metres, kilometres, tens of kilometres, hundreds of kilometres or more. The ranging process may use round-trip-timing (RTT) ranging or multicarrier phase-based ranging or a combination of both. The first transceiver device 1 also embodies a "first radio device" as disclosed herein, and the second transceiver device 2 also embodies a "second radio device" as disclosed herein.

The devices 1, 2 may be any radio-equipped devices, such as smartphones, wireless sensors, household appliances, land vehicles, satellites, etc. In one set of embodiments, the devices 1, 2 are consumer electronics products, and are configured to communicate over a Bluetooth™ Low Energy communication link.

The devices 1, 2 contain respective local oscillators that run independently between the two devices. The device 1, 2 are therefore configured to engage in a two-way ranging protocol that does not rely on having synchronized clocks.

The devices 1, 2 may use half-duplex communication, whereby one device is in a receiving state while the other device is transmitting. The devices 1, 2 may enter a power-saving state when not expecting to receive transmissions, in which their radio receive circuitry is inactive. It can be important that the devices 1, 2 synchronize their communications so that receive windows are started and ended appropriately, to ensure reliable and efficient communication. Approaches for doing this are disclosed in more detail below.

To measure the distance d using phase-based ranging, the initiator device 1 sends a first unmodulated radio signal—i.e. a pure continuous sine-wave carrier—of frequency $f_1$, for a predetermined duration. It may generate this signal directly by amplifying the output of a local oscillator, or it may pass a stream of constant bit values (e.g. all "1"s) through a frequency-shift-key modulator in the device 1. The radio signal is received by the reflector device 2 which measures the phase of the received signal relative to a signal generated using a local oscillator of the reflector 2. After a predetermined interval from receiving the radio signal from the initiator device 1, the reflector 2 transmits a second unmodulated radio signal, or tone, of frequency $f_R$, to the initiator 1. The initiator 1 measures a second phase relative to the local oscillator of the initiator 1.

A succession of such two-way radio exchanges are performed across a plurality of different initiator carrier frequencies. One of the devices, e.g. the reflector 2, sends its phase measurements by radio to the other device, e.g. the initiator 1, which combines them with its own phase measurements in order to estimate the distance, d. By performing the exchanges over two or more initiator carrier frequencies, the distance can be determined unambiguously, rather than modulo a wavelength. Performing further exchanges, using different initiator frequencies, can provide redundancy that can help mitigate against interference and multipath fading.

Assuming no multipath interference, noise or other impairments, the sum $\psi$ of the phase differences measured at each device 1, 2 for a particular carrier frequency, is related to the distance, d, between the devices 1, 2 by $$\psi \approx -\frac{2\pi d(f_I + f_R)}{c} - 2\pi \Delta f T + C$$

where $f_I$ and $f_R$ are the signal frequencies transmitted by the initiator 1 and reflector 2 respectively, and also used for determining the phase offset measurements. T is the time between phase measurements, $\Delta f$ is the offset between $f_I$ and $f_R$, and C is a constant.

If $\Delta f=0$, the time dependence disappears. Because the devices 1, 2 are not synchronous, it is desirable to minimize $\Delta f$ so that the time dependence is sufficiently small that it can be disregarded while preserving a desired level of accuracy in the distance estimation.

This can be done by performing a calibration stage, before a main two-way ranging stage, in which the reflector 2 sends a succession of unmodulated calibration signals to the initiator 1. The initiator 1 calculates a fractional frequency offset (FFO) of the reflector 2 relative to its local oscillator in an initial state and then uses this to adjust its local oscillator so that the set of frequencies it transmits in the ranging stage more closely equal the frequencies that the reflector 2 will transmit in response. It also uses the adjusted local oscillator frequencies when down-mixing incoming signals received from the reflector 2.

In order to keep $\Delta f$ as close to zero as possible during the ranging stage, it is desirable that both the initiator device 1 and the reflector device 2 to have good frequency stability, so that the fractional frequency offset value measured during the calibration stage remains accurate over the duration of the ranging stage. A round-trip timing (RTT) operation is another approach for estimating the distance d, based on times of flight. It may be used by the devices 1, 2 as alternative to phase-based ranging (e.g. if one of the devices does not support phase-based ranging). In some embodiments, RTT may be used in combination with a phase-based ranging operation—e.g. to obtain an initial, coarse estimate of the distance d, which can be used to synchronize the exchange of subsequent unmodulated ranging signals for reliably obtaining a more-accurate estimate of the distance d using phase-based ranging.

In a RTT operation, the initiator device 1 transmits a first data packet that is received by the reflector device 2. The reflector device 2 then transmits a second data packet that is received by the initiator 1. By measuring the transmission and reception times of these packets, one or both of the devices 1, 2 can estimate the distance, d, between them, making use of the known speed of light, c, at which the radio signals travel between the two devices 1, 2.

Figure 2:
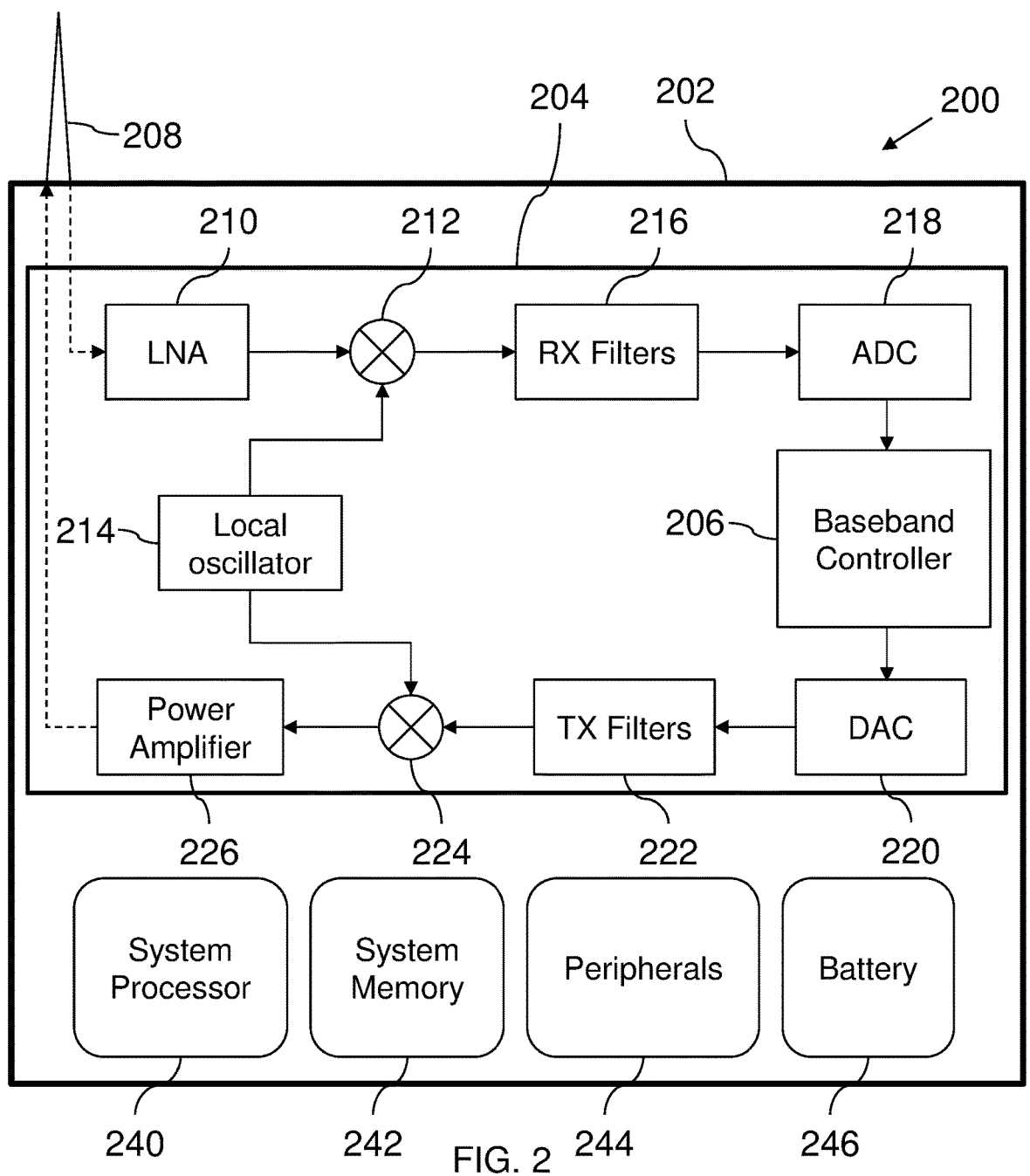
FIG. 2 is a schematic diagram of a radio transceiver for use in a ranging process embodying the invention.

FIG. 2 shows the major components of a radio device 200, which could act as the initiator device 1 or as the reflector device 2, in exemplary embodiments. In some systems 10, the initiator and reflector devices 1, 2 may each have all the features of the device 200 shown in FIG. 2, although this is not essential.

The radio device 200 contains, within a housing 202, an integrated-circuit radio transceiver chip 204 that supports Bluetooth™ Low Energy communications. It may additionally support other radio protocols such as IEEE 802.11, 3GPP LTE Cat-M1, 3GPP LTE NB-IoT, IEEE 802.15.4, Zigbee™, Thread™, ANT™, etc.

The radio chip 204 contains a baseband controller 206, which includes dedicated hardware logic, as well as memory for storing software, and a processor for executing the software, such as an Arm™ Cortex™ processor. It may include one or more DSPs or further processors. The baseband controller 206 is connected to one or more radio antennae 208 by a transmit path, for transmitting radio data, and by a receive path, for receiving incoming radio data. Some embodiments may transmit and receive over multiple antennae, e.g. to provide antenna diversity. The receive path includes a low-noise amplifier (LNA) 210, a quadrature mixer 212 for downmixing an incoming radio-frequency (e.g. 2.4 GHz) signal to an intermediate frequency (IF) or to baseband by mixing the RF signal with a periodic signal generated by a local oscillator 214, a set of analog receive filters 216, and an analog-to-digital converter (ADC) 218. The transmit path includes a digital-to-analog converter (DAC) 220, a set of analog transmit filters 222, a quadrature mixer 224 for up-mixing a baseband signal to a radio frequency (RF) signal using a periodic signal generated by the local oscillator 214, and a power amplifier (PA) 226. The transmit and receive paths may also including components, not shown in FIG. 2, such as RF filtering between the antenna 208 and the LNA 210 or PA 226.

The baseband controller 206 performs digital operations for the transmit and receive paths. On the receive path, it provides digital filtering and GFSK demodulation. On the transmit path, it provides GFSK modulation and digital filtering. It may also perform higher-level operations such as assembling and disassembling data packets, generating and verifying checksums, cryptographic operations, etc. In some embodiments it may implement a full Bluetooth™ Low Energy protocol stack.

When receiving a radio signal, the device 200 down-mixes the incoming RF signal to an intermediate frequency, or to baseband, using the receive mixer 212. It samples the down-mixed signal using the ADC 218 operating at a sampling rate, set by a sampling clock signal, in order to generate a digital representation of the signal. The sampled signal can be digitally filtered and GFSK-demodulated in the baseband controller 206.

When transmitting a radio signal, the baseband controller 206 outputs digital samples representing a GFSK-modulated signal to the DAC 220 at the same sampling rate, set by the sampling clock signal. These are then filtered by the transmission filters 222 and up-mixed by the mixer 224 for transmission.

The baseband controller 206 is able to set the frequency of the local oscillator 214 to different frequencies for transmitting at different carrier frequencies, and for down-mixing received signals using different mixing frequencies.

The chip 204 may optionally include further processors, volatile memory, non-volatile memory, peripherals, or other components, integrated on the same chip as the radio transceiver circuitry, for performing additional functions.

The radio device 200 in this example also contains—separate from the radio chip 204—a system processor 240, system memory 242 (which may include volatile memory (e.g., RAM) and/or non-volatile memory (e.g., flash)), peripherals 244 (such as a temperature sensor or I/O modules), and a battery 246. The radio antennae 208 may be within the housing 202 or external to the housing 202, and may be connected to the radio chip 204 by appropriate components, or may be integrated on the radio chip 204.

The radio device 200 and/or radio chip 204 can contain other components, such as buses, crystals, digital logic, analog circuitry, discrete active components, discrete passive components, further processors, user interface components, etc. which are not shown in FIG. 2 for the sake of simplicity. The radio device 200 may be a component of a larger device, such as a car or a domestic appliance, or it may be a standalone radio device.

In use, software is executed by the baseband controller 206 to perform a two-way ranging process, which may involve phase-based and/or round-trip timing (RTT) operations.

The radio devices 1, 2 contain complementary software and/or hard-wired logic for carrying out their respective parts of the ranging process. A resulting distance estimate, d, calculated by the initiator device 1 (or by the reflector device 2) may be output to the system processor 240 for further use, or it may be stored or further processed within the radio chip 204.

Each device 1, 2 may be configured for transmitting a respective modulated timing signal (e.g. a synchronization sequence) and/or an unmodulated carrier signal within a radio data packet. In some embodiments, the data packet is Gaussian frequency-shift-key (GFSK) encoded. The data packet may conform to a current or future Bluetooth™ specification. It may be a Bluetooth™ Low Energy (BLE) packet.

When transmitting an unmodulated tone, the unmodulated signal may occupy a portion of a larger packet—e.g. being preceded by a packet preamble and/or followed by further elements of the data packet, such as message data.

When transmitting a modulated timing signal, the timing signal may comprise a predetermined bit sequence that is modulated on the radio signal—e.g. a known 32 or 64 bit sequence. This synchronization sequence could be constant over repeated RTT operations between the devices 1, 2, and potentially constant over all time. Alternatively, it could be generated afresh by the initiator 1 and reflector 2, from some shared information, for each RTT process or session; for example, it may be a pseudo-random number sequence generated identically by both devices 1, 2 using a commonly-seeded engine, such as an AES cipher engine. The synchronization sequence may occupy an entire data packet, or it may be only a portion of the packet—e.g. being preceded and/or followed by further elements of the data packet, such as a preamble, message data and/or an unmodulated carrier signal.

In some embodiments, each device 1, 2 can determine a time of departure (transmission) of a timing signal that it is transmitting. It can also determine a time of reception of a timing signal that it receives.

Figure 3:
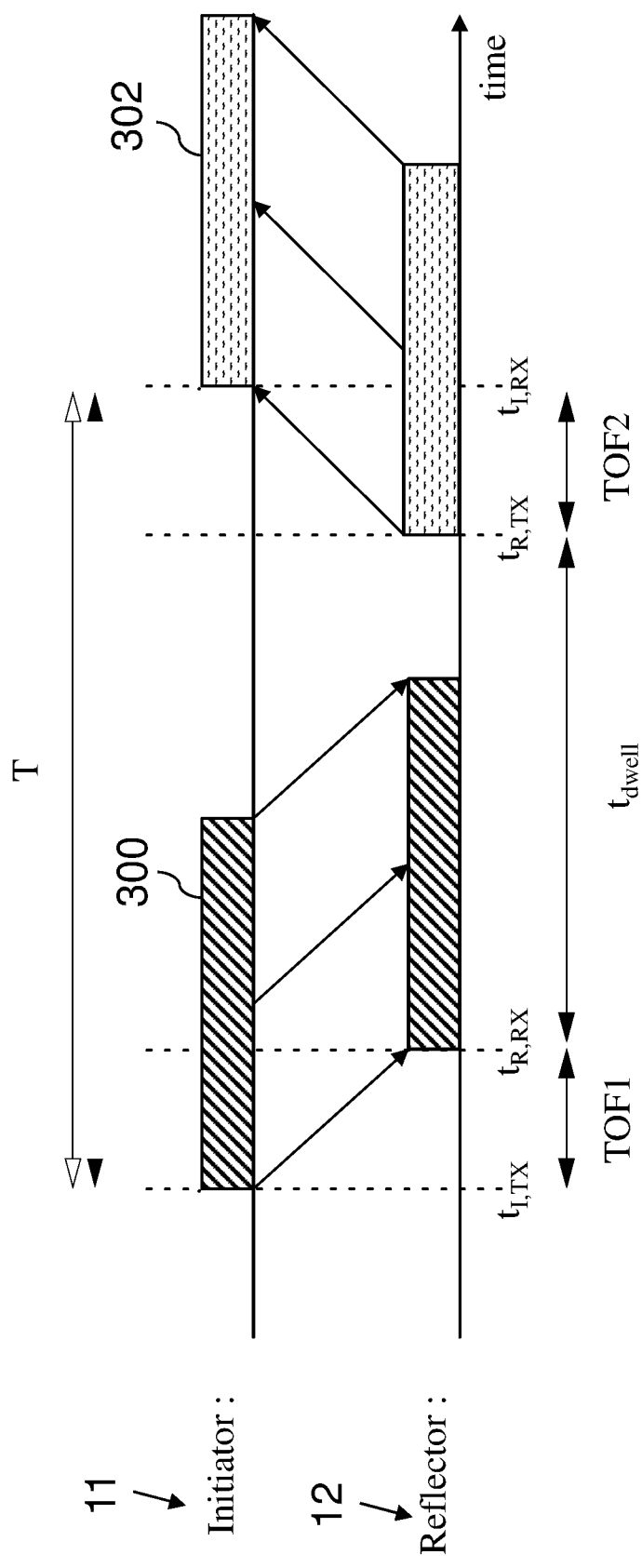
FIG. 3 is a timing diagram of a radio packet exchange from a round-trip timing (RTT) ranging process.

FIG. 3 shows an exemplary radio packet exchange between the initiator device 1 and the reflector device 2 when performing a round-trip timing (RTT) process.

At a time $t_{I,TX}$, the initiator 1 transmits a first radio timing signal 300, which is received by the reflector device 2 at a time $t_{R,RX}$. The difference between $t_{R,RX}$ and $t_{I,TX}$ corresponds to a first time-of-flight period TOF1.

After a dwell time, $t_{dwell}$, at a time, $t_{R,TX}$, the reflector device 2 transmits a second radio timing signal 302, which is received by the initiator device 1 at a time $t_{I,RX}$. The difference between $t_{I,RX}$ and $t_{R,TX}$ corresponds to a second time-of-flight period TOF2.

The total time, T, for the RTT communication exchange satisfies:

$$T = TOF1 + t_{dwell} + TOF2$$

and also $$T = t_{I,RX} - t_{I,TX}.$$

An average time-of-flight, TOF, for the two timing signals 300, 302 can therefore be calculated as:

$$TOF = (t_{I,RX} - t_{I,TX} - t_{dwell})/2$$

If the dwell time, $t_{dwell}$, is known to the initiator device 1, this TOF value can be calculated by the initiator 1 from $t_{I,RX}$ and $t_{I,TX}$ without it requiring any knowledge of the times $t_{R,RX}$ and $t_{R,TX}$.

By dividing this TOF value by a known speed of the radio signals 300, 302 between the two devices—e.g. the speed of light in air, c—the initiator 1 can, if required, obtain a measurement of the average separation distance between the two devices during the RTT operation. If the devices 1, 2 are stationary, or if the dwell time, $t_{dwell}$, is sufficiently short as to be able to discount any relative motion between them, then TOF1=TOF2 and this average value will simply equal the separation distance.

The RTT exchange can be repeated a few times, and the resulting TOF values averaged, to reduce noise. Such averaging can also determine a final TOF value to a precision that is finer than the sampling clock. This can be possible even when the RTTs measured in clock cycles are constant, e.g. because the clock phases of the devices are locked through an event (if FFO is small enough). Sending many packets may also remove bias by exploiting clock phase offset drift and employing dithering techniques.

By using a constant predetermined dwell time, $t_{dwell}$, known in advance to the initiator 1, in the RTT process, the initiator 1 can obtain an estimate of the separation distance between the two devices without a need for the reflector 2 to send any timing data to the initiator 1. The dwell time, $t_{dwell}$, could be negotiated in advance between the devices 1, 2, or it could be fixed, e.g. by an agreed standard or specification to which both devices 1, 2 conform.

Even when the separate distance, d, is relatively large (e.g. 100 metres or more), because the speed of the radio signals 300, 302 through air is so fast, it is not necessarily straightforward for the reflector 2 to implement a constant dwell time, $t_{dwell}$ of sufficient accuracy to enable accurate distance ranging. In particular, the receive and transmit paths of the reflector 2 are timed by a clock that is not synchronized to the initiator 1. In order to improve the accuracy, some embodiments may perform fractional-delay adjustments so that the precision of the dwell time, $t_{dwell}$, is not limited by the sampling period of this clock, e.g. by adding or subtracting one or more clock cycles at the end of certain steps within a ranging event, or using fractional delay filters.

A RTT process may, in some embodiments, be combined with a phase-based ranging process, in a single ranging process, as explained in more detail below. First, however, the principles of phase-based ranging process will be explained.

Figure 4:
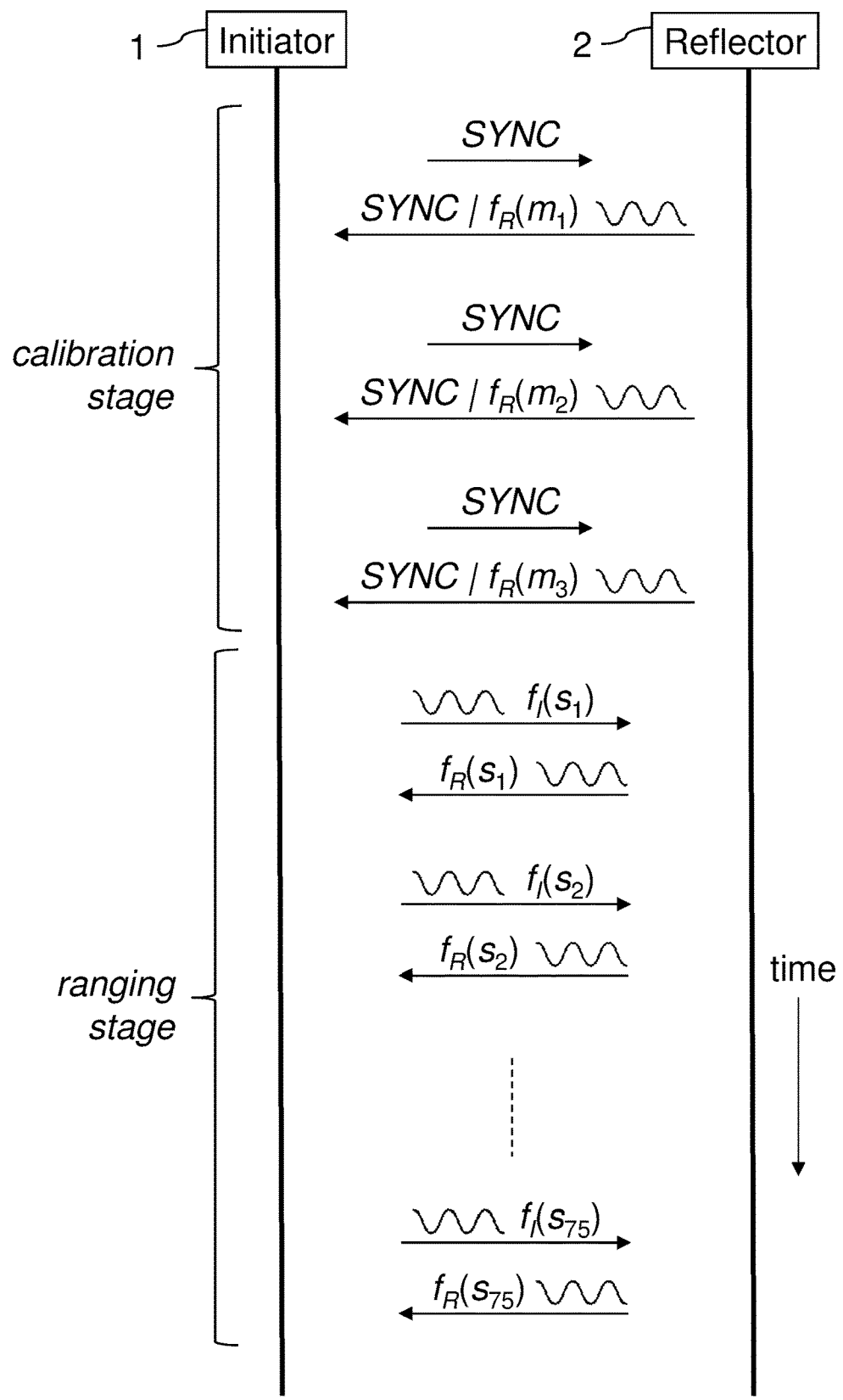
FIG. 4 is a sequence diagram of a multicarrier phase-based ranging process.

FIG. 4 is a flowchart showing steps of an exemplary two-way phase-based ranging process.

The process is divided into two phases: a calibration stage followed by a ranging stage. The calibration stage in this example involves three steps, while the ranging stage involves seventy-five steps. However, these numbers may of course be varied. Each step involves a respective two-way signal exchange.

In each step of the calibration stage, the initiator device 1 sends a synchronization data packet, containing a modulated synchronization sequence (SYNC), to the reflector device 2. The reflector 2 responds after a predetermined delay by sending a data packet that includes a modulated synchronization sequence (SYNC) followed by an unmodulated carrier signal (represented in FIG. 4 by a frequency value, f, and a sine wave graphic). The reflector 2 sets its local oscillator 214 to a different carrier frequency at each step, here denoted $f_R(m_1)$, $f_R(m_2)$ and $f_R(m_3)$. The succession of calibration frequencies and the timings of the transmissions are determined in advance, e.g. in a negotiation phase between the devices 1, 2. The nominal transmission timings may comply with an agreed standard or specification. In the calibration stage, each unmodulated carrier signal may be transmitted for any appropriate duration, e.g. for 100 µs, which corresponds to a few hundred-thousand cycle periods for carriers in the 2.4 GHz band.

The start and end times of the unmodulated carrier transmitted by the initiator 1 for each step may be denoted as $t_I^1[k]$ and $t_I^2[k]$, and the start and end times of the unmodulated carrier transmitted by the reflector 2 for each step may be denoted $t_R^1[k]$ and $t_R^2[k]$. The total duration of the calibration and ranging stages may be denoted $T_{test}$, where the time t=0 corresponds to the start of the first transmission by the initiator 1 within the calibration stage of the ranging event.

In each step of the ranging stage, the initiator 1 sends an unmodulated carrier signal to the reflector 2, which responds, after a predetermined nominal delay, with an unmodulated carrier signal having the same nominal frequency as the signal transmitted by the initiator 1. The carrier frequencies sent by the initiator 1 vary across the steps according a schedule that is agreed in advance between the devices 1, 2.

These frequencies are here denoted $f_I(s_1)$, $f_I(s_2)$, ..., $f_I(s_{75})$. Although the reflected frequencies, $f_R(s_1)$, $f_R(s_2)$, ..., $f_R(s_{75})$, are nominally the same, in practice they will differ due to frequency inaccuracy in both devices 1, 2 (e.g. due to production imperfections). In the ranging stage, each unmodulated carrier signal is transmitted for a respective duration which could be as short as 1 or 10 µs. This corresponds to a few thousand cycle periods for carriers in the 2.4 GHz band.

At each calibration step, the initiator 1 sets its local oscillator 214 based on the expected frequency $f_R$ for that step and estimates a fractional frequency offset (FFO) (e.g. a value in parts per million) between the incoming signal from the reflector 2 and a local oscillator signal generated by the initiator 1. The local oscillator 214 of the initiator 1 could be set to exactly $f_R$ (i.e. a zero-IF) or to frequency that is offset by a planned intermediate frequency (e.g. low-IF reception). The initiator 1 may select one of these FFO values, or may average them, to determine a frequency adjustment factor. At each ranging step, the initiator 1 uses the determined frequency adjustment factor to adjust its local oscillator 214 so that the frequency $f_I$ that the initiator 1 transmits will more closely match the response frequency $f_R$ that the reflector 2 will output in response. The initiator 1 also uses the set FFO values to adjust its transmission timings, as explained in more detail below.

In the ranging steps, when receiving incoming unmodulated signals, each device 1, 2 sets its local oscillator 214 to the expected incoming frequency (adjusted by the frequency adjustment factor in the case of the initiator 1, and offset any non-zero intermediate frequency if additional downmixing is performed in the digital domain) and measures a phase offset between the incoming signal and the local-oscillator output. At the end of the ranging stage, the reflector 2 sends a data packet containing all of its phase measurements to the initiator 1, which may combine them with the phase measurements it made in order to calculate an estimate of the distance d according to known principles.

Figure 5:
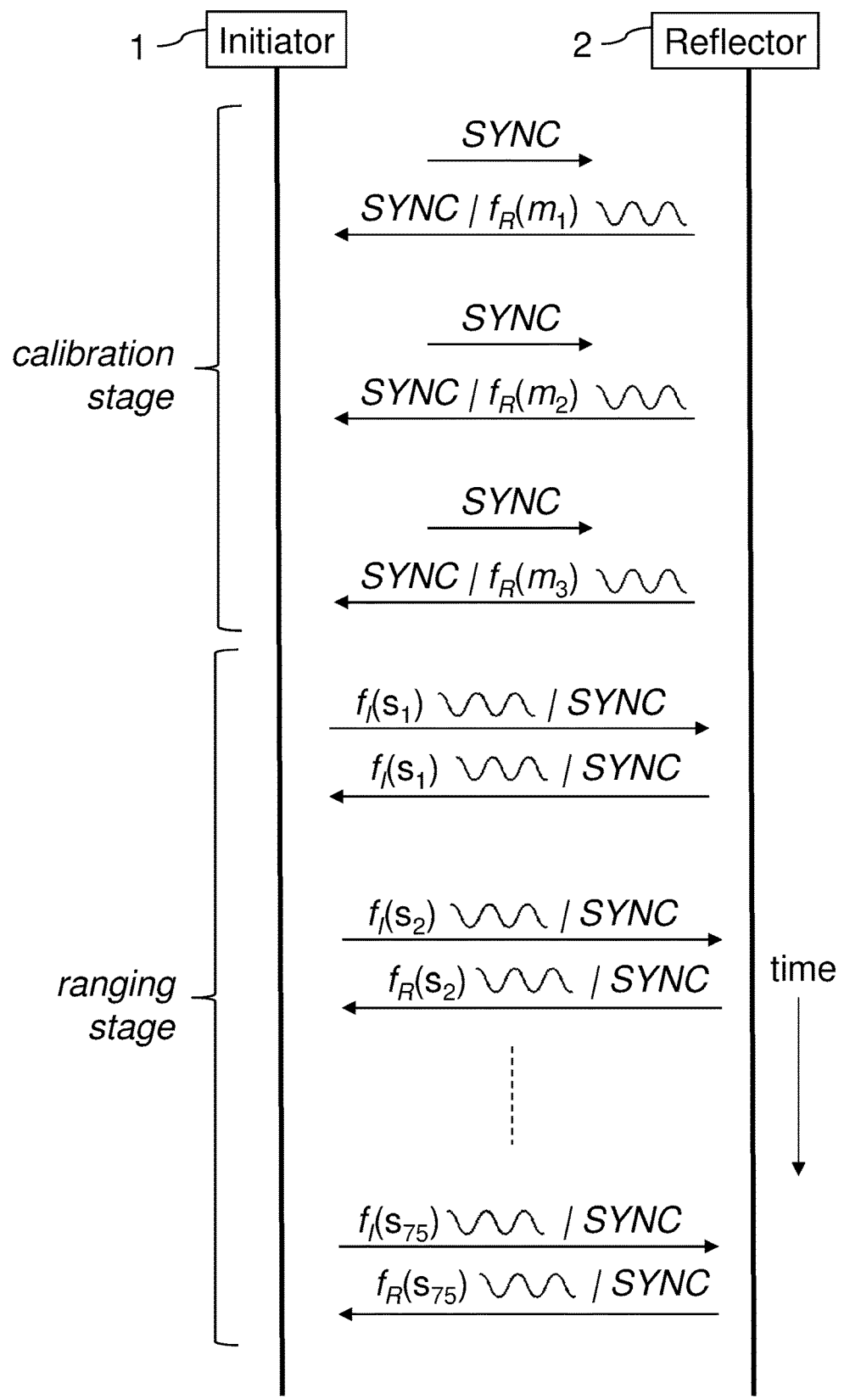
FIG. 5 is a sequence diagram of a combined RTT and multicarrier phase-based ranging process.

FIG. 5 is a flowchart showing steps of a ranging process in which the data packets exchanged in both directions in the ranging stage include modulated predetermined synchronization sequences (SYNC) in addition to unmodulated synchronization sine-wave carrier tones. This enables the devices 1, 2 to use the same packets for phase-based ranging or RTT ranging or a combination of both.

In some embodiments, the initiator 1 may be configured to align the timing of its transmissions based on the timings of the transmissions it receives from the reflector 2. The reflector 2, embodying the invention, is also preferably configured to adapt the timings of its transmissions and reception windows in order to reduce the likelihood of a ranging step failing due to a modulated or unmodulated signal not being received at all, or being insufficiently received, by a recipient device 1, 2. This can improve the reliability of ranging events, compared with reflector devices that use only a fixed, nominal timing schedule.

This approach may be especially beneficial when the devices 1, 2 are developed by different manufacturers using different components and tolerances, which might normally present a challenge to interoperability. It may also be beneficial when a ranging event is performed between one initiator device and a plurality of reflector devices simultaneously.

How the initiator 1 and/or reflector 2 may be configured to give improved reliability in some embodiments will now be described in more detail.

Principals of Operation

In an exemplary ranging event, the reflector 2 first responds to one or more calibration steps (e.g. as shown in FIG. 5).

By analysing the responses from the reflector 2 in these calibration steps the initiator 1 calculates estimates for the
  fractional frequency offset (e.g. crystal offset ppm) between the devices; and
  the time-of-flight (ToF) between the devices.

The initiator 1 then adjusts the timing of its transmissions, based on these estimates, to ensure that it is available during a nominal receive window of the reflector 2, for any combination of these estimates of fractional frequency offset (FFO) and time-of-flight.

The reflector 2, also, measures the time-of-arrival of each calibration step, and processes these to offset the timing of its transmissions and reception windows. The reflector 2 does not, however, change the carrier frequencies of the unmodulated signals its transmits, but rather the initiator 1 adjusts its carrier frequencies to match those of the reflector 2.

To compensate for any fractional frequency offset (FFO) between the devices 1, 2, the initiator 1 ensures that the start and end of its transmit windows are adjusted, from times predetermined by an agreed nominal schedule, to align with the reflector 2. In practice, this can be achieved by adding/subtracting one or more clock cycles at the end of certain steps within an event. In addition, the initiator 1 can oversize its transmit windows to account for its own potential error, and the potential error of the reflector 2 device.

In addition, to compensate for a time-of-flight between devices, the initiator 1 places its receive window a factor of 2×ToF later than the nominal timing. This implies a shortening of the time between transmit (TX) and receive (RX) windows.

The reflector 2 also generates estimates for the time-of-arrival (ToA) of the signals it receives from the initiator 1 during the plurality of calibration steps. This leads to a set of values for the time-of-arrival. The reflector 2 adjusts the size of its receive window based on the variation in these time-of-arrival values. This is done by choosing an "anchor" for determining the start of its receive windows, and an "anchor" for determining the end of its receive window. The period between the anchors is preferably no greater than the nominal time for the transmission window (i.e. the transmission duration as specified in a standardised transmission schedule).

The initiator 1 and reflector 2 also preferably compensate for potential inaccuracy in the estimation of FFO, ToF and the time-of-arrival (ToA). Some of this inaccuracy may be due to the respective device itself (e.g. phase noise limiting FFO estimation error, or sampling rate limiting ToA accuracy). Some of this inaccuracy may be due to the peer device (e.g. reflector dwell-time jitter, or peer crystal drift). Some may be due to environmental effects (e.g. group delay variation of the multipath channel, or interference during the FFO estimation step).

It will generally be desirable to try to limit the error sources in the devices so that the system 10 works efficiently, at least within certain environmental limits. However, correct operation may not be possible in all cases (e.g. pathological channel impulse responses which allow for large group delays at specific frequencies, or when experiencing very large amounts of interference). The timings given below are intended to allow the devices 1, 2 to work reliably even under a variation in the ToF across tones of up to 0.125 μs and a drift of the fractional frequency offset across the duration of a ranging event of up to 1 ppm.

Terminology

Each exemplary ranging event contains M+K steps, that begin with M calibration steps followed by K ranging steps, indexed by k=1, . . . , M, M+1, . . . , M+K. The total duration of the ranging event is denoted $T_{EVT}$, and in the following the time t=0 corresponds to the start of the first transmission within a ranging event. Each step may contain multiple transmission slots, each using a separate antenna or subset of antennas. The number of antenna slots within a specific step will herein be denoted as $N_A[k]$.

The nominal start and end times of the transmissions in each step may be determined according to a predetermined specification or standard, implemented by the system 10. This may also specify the duration and contents of each data packet.

The nominal start and end times of each unmodulated carrier transmitted by the reflector 2, relative to the start of the event (i.e. time t=0), for each antenna slot p=1, . . . ,$N_A[k]$, for each step, will herein be denoted as $t_{R,TX,UC,nom}^{1,p}[k]$ and $t_{R,TX,UC,nom}^{2,p}[k]$ respectively.

The nominal start and end times of each unmodulated carrier transmitted by the initiator 1, relative to the start of the event, for each antenna slot=1, . . . ,$N_A[k]$, for each step, will herein be denoted as $t_{I,TX,UC,nom}^{1,p}[k]$ and $t_{I,TX,UC,nom}^{2,p}[k]$ respectively.

The nominal start and end times of each modulated carrier transmitted by the reflector 2, relative to the start of the event, for each antenna slot p=1, . . . ,$N_A[k]$, for each step, will herein be denoted as $t_{R,TX,MC,nom}^{1,p}[k]$ and $t_{R,TX,MC,nom}^{2,p}[k]$ respectively.

The nominal start and end times of the modulated carrier transmitted by the initiator 1, relative to the start of the event, for each antenna slot p=1, . . . ,$N_A[k]$, for each step, will herein be denoted as $t_{I,TX,MC,nom}^{1,p}[k]$ and $t_{I,TX,MC,nom}^{2,p}[k]$ respectively. Consequently, the value of $t_{I,TX,MC,nom}^{1,1}[k]=0$.

The nominal transmit window (i.e. before any adjustment is applied) of the initiator 1 corresponds to the nominal receive window of the reflector 2 and vice versa—i.e. $t_{I,TX,*C,nom}^{1,p}[k]=t_{R,TX,*C,nom}^{1,p}[k]$.

$f_0(k)$ herein denotes the nominal frequency of the ranging channel for step k. The nominal (i.e. specified) frequencies used at each step may be defined by a predetermined specification or standard, implemented by the system 10. Each ranging event begins with a number of calibration steps and therefore $f_0(m)$ denotes the nominal frequency of the ranging channel used in the calibration step m.

The average transmitted frequency of the reflector's unmodulated carrier, during any interval of a ranging step defined to use an unmodulated carrier, is herein denoted $f_R(k)$.

Details relating particularly (although not exclusively) to the configuration of exemplary reflectors 2 are given in the following section. Details relating particularly (although not exclusively) to the configuration of exemplary initiators 1 are given further below.

Reflector

The fractional frequency offset of the reflector 2, relative to a nominal perfect reference frequency source, $f_0$, for a particular calibration step m=1, . . . , M, is herein denoted $FFO_R(m)$, and is given by $$FFO_R(m) = \frac{f_R(m) - f_0(m)}{f_0(m)}$$

A nominal fractional frequency offset, $FFO_R^{nom}$, may be defined by any fractional frequency offset from the set $$FFO_R^{nom} = \{FFO_R(m) | m=1, \ldots, M\}.$$

The devices 1, 2 are preferably designed and manufactured so that, for all calibration steps, the absolute value of $FFO_R(m)$ will be less than 50 ppm, and the range of values of $FFO_R(m)$ within a ranging event does not exceed 1 ppm. However, different values may be set in alternative design specifications.

In operation, the reflector 2 estimates the time-of-arrival (ToA) at its antenna of each received SYNC packet within each calibration step. Denote the recorded value as $ToA_R[m]$.

From the calibration stage, the reflector 2 corrects $ToA_R[m]$ by the nominal time-of-arrival of each SYNC packet since the start of the event—i.e. by subtracting, from $ToA_R[m]$, the time at which the calibration SYNC packet should be received, according to the specified schedule, if there were no synchronization inaccuracies and a time-of-flight of zero—to generate an "anchor" $tAnc_R$ for the event. Each anchor value that is calculated by the reflector 2 represents the sum of a time-of-flight and a timing delay, and corresponds to a respective "timing offset" as disclosed herein. The set of nominal anchors is denoted as $$tAnc_R \in tAnc_R^{nom} = \{ToA_R[m] - t_{I,TX,MC,nom}^{1,p}[m] | m=1, \ldots, M, p=1, \ldots, N_A[m]\}$$

The reflector 2 then adjusts the times of all its transmissions in the ranging stage to be consistent with this set of anchor points $tAnc_R^{nom}$, as described below.

The reflector 2 adjusts the transmission times of each ranging-stage data packet it sends, e.g. using an adjustment procedure explained below, so as to ensure that the latest start time of the transmission of each unmodulated carrier, measured at the antenna of the reflector 2, satisfies $$t_{R,TX,UC}^{1,p}[k] \leq \frac{t_{R,TX,UC,nom}^{1,p}[k]}{1 + FFO_R + 1\,ppm} - tAnc_R - 0.25\,\mu s,$$

$$\forall\, tAnc_R \in tAnc_R^{nom},$$

$$\forall\, FFO \in FFO_R^{nom}$$

This inequality results in each transmission starting cautiously early, based on a worst-case assumption of the largest fractional frequency offset in $FFO_R^{nom}$ (which may be a constant parameter value, such as 50 ppm, determined from a design specification to which the reflector 2 is known to conform) and the longest transit delay represented in $tAnc_R^{anc,nom}$ (which may be estimated from time-of-arrival measurements by the reflector 2).

The reflector 2 also adjusts the duration of each ranging-stage data packet that it transmits, e.g. using an adjustment procedure explained below, so as to ensure that the earliest end time of each transmission of an unmodulated carrier, measured at the antenna of the reflector 2, satisfies $$t_{R,TX,UC}^{2,p}[k] \geq \frac{t_{R,TX,UC,nom}^{2,p}[k]}{1 + FFO_R - 1\,ppm} - tAnc_R + 0.25\,\mu s,$$

$$\forall\, tAnc_R \in tAnc_R^{nom},$$

$$\forall\, FFO \in FFO_R^{nom}$$

This inequality results in each transmission ending cautiously late, based on a worst-case assumption of the largest negative fractional frequency offset from $FFO_R^{nom}$ and the shortest transit delay represented in $tAnc_R^{anc,nom}$.

The inclusion of the ±1 ppm and 0.25 µs terms is to account for an allowed initiator peer variation and a lower bound on the environmental tolerance, which in this example require that:

the initiator estimates the reflector's FFO with an error of at most 1 ppm between calibration packets;

the initiator has a time-of-departure (ToD) jitter of calibration packets of at most 0.125 µs; and the ToF variation across frequencies is at most 0.125 µs.

In other embodiments, these values may be specified differently.

The reflector 2 preferably over-sizes its transmission sufficiently, compared with a nominal specification, to provide enough margin for its own sources of error, arising from an expected FFO stability, and from an expected signal delay variation (e.g. antenna, match and radio group delay)—i.e. based on predetermined bounds on its FFO stability and signal delay variation.

Thus the reflector 2 may implement limits that are more cautious than those of the inequalities above, based on predetermined bounds on its own parameters. It may take account of bounds such as that, for example:

the reflector 2 transmits a tone with at most 1 ppm offset compared to the rest of the ranging process, allowing a drift of at most 1 ppm across the ranging event; and the reflector 2 has a dwell time jitter of at most 0.125 µs.

Therefore, in this example, the reflector 2 may increase the magnitude of the factor to account for these further values, e.g. to satisfy $$t_{R,TX,UC}^{1,p}[k] \leq \frac{t_{R,TX,UC,nom}^{1,p}[k]}{1 + FFO_R + 2\,ppm} - tAnc_R - 0.375\,\mu s,$$

$$\forall\, tAnc_R \in tAnc_R^{nom},$$

$$\forall\, FFO \in FFO_R^{nom}$$

$$t_{R,TX,UC}^{2,p}[k] \geq \frac{t_{R,TX,UC,nom}^{2,p}[k]}{1 + FFO_R - 2\,ppm} - tAnc_R + 0.375\,\mu s,$$

$$\forall\, tAnc_R \in tAnc_R^{nom},$$

$$\forall\, FFO \in FFO_R^{nom}$$

The reflector 2 may be configured to ensure its transmissions in the ranging stage satisfy these adjusted inequalities by starting and ending each transmission exactly on the limits allowed by these inequalities (or that lie within them by a further predetermined safety margin).

For example, it may calculate the start time of the k-th unmodulated-carrier transmission as:

$$t_{R,TX,UC}^{1,p}[k] = \frac{t_{R,TX,UC,nom}^{1,p}[k]}{1 + 50\,ppm + 2\,ppm} - \max(tAnc_R^{nom}) - 0.25\,\mu s$$

and the end time as:

$$t_{R,TX,UC}^{2,p}[k] = \frac{t_{R,TX,UC,nom}^{2,p}[k]}{1 - 50\,ppm - 1\,ppm} - \min(tAnc_R^{nom}) - 0.25\,\mu s$$

Thus the reflector 2 can oversize its transmission window so that the conditions in this section are always satisfied, including taking account of the expected error in the reflector's own ToA measurements and FFO. The reflector 2 maintains a constant system clock frequency during the ranging stage.

When receiving incoming transmissions from the initiator 1, the reflector 2 may be configured to undersize its sampling window. Based on the times-of-arrival of the calibration packets, the reflector 2 determines start times of its receive windows that are slightly after the nominal values, and end times that are slightly before the nominal values.

In this case, the reflector 2 can assume that the initiator 1 has appropriately shifted and oversized its transmissions, based on the calibration step (as explained in more detail below). However the reflector 2 may compensate for any further imperfections by correcting its receive times. For example, the start of the receive window for an unmodulated carrier by the reflector 2 may be set to satisfy:

$$t_{R,RX,UC}^{1,p}[k] \geq \frac{t_{R,TX,UC,nom}^{1,p}[k]}{1 + FFO_R - 1\,ppm} - tAnc_R + 0.125\,\mu s + T_{R,RX,int,UL},$$

$$\forall\, tAnc_R \in tAnc_R^{nom},$$

-continued $$\forall \, FFO \in FFO_R^{nom}$$

$$t_{R,RX,UC,nom}^{2,p}[k] \le \frac{t_{R,TX,UC,nom}^{2,p}[k]}{1+FFO_R+1ppm} - tAnc_R - 0.125\,\mu s + T_{R,RX,int,LL},$$

$$\forall \, tAnc_R \in tAnc_R^{nom},$$

$$\forall \, FFO \in FFO_R^{nom}$$

where $T_{R,RX,int,UL}$ and $T_{R,RX,int,LL}$ represent predetermined upper and lower limits on the internal delay within the radio of the reflector 2.

It may, in some embodiments, be configured to meet these inequalities exactly, e.g. by calculating:

$$t_{R,RX,UC}^{1,p}[k] = \frac{t_{R,TX,UC,nom}^{1,p}[k]}{1-50ppm-1ppm} - \min(tAnc_R^{nom}) + 0.125\,\mu s + T_{R,RX,int,UL}$$

and:

$$t_{R,RX,UC,nom}^{2,p}[k] =$$

$$\frac{t_{R,TX,UC,nom}^{2,p}[k]}{1+50ppm+1ppm} - \max(tAnc_R^{nom}) - 0.125\,\mu s + T_{R,RX,int,LL}$$

The reflector 2 may then control its radio transceiver so as to be active for receiving and sampling unmodulated carriers during the interval $[t_{R,RX,UC}^{1,p}[k], t_{R,RX,UC,nom}^{2,p}[k]]$. The reflector 2 may assume that the signal is stable during this period, in the absence of interference.

The reflector 2 may also have an internal mechanism to judge the quality of the ToA measurements it makes. It may filter or weight its estimates accordingly. This can enable the reflector 2 to account for low signal level or interference that can lead to lower-quality FFO measurements.

The timing of transmission of each packet sent by the reflector 2 during a ranging step may be specified relative to the time of arrival of the packet within the same ranging step. The time between the reception of a packet from the initiator 1, as seen at the antenna of the reflector 2, and the transmission of the response packet from the antenna of the reflector 2, is denoted the "dwell time" and is given as $T_D[k]=ToD_R[k]-ToA_R[k]$, where $ToA_R[k]$ is the observed time-of-arrival of the initiator packet, and $ToD_R[k]$ is the observed time-of-departure of the reflector packet.

In some embodiments, the reflector 2 is designed and configured so that the dwell-time $T_D[k]$ does not deviate from a nominal (i.e. specified) dwell time for any step by more than 0.375 µs. This allows the initiator 1 to align its timing sufficiently within a calibration step. It also allows the initiator 1 to optionally implement a mechanism to adjust timing drift where the calibration-based mechanism fails, e.g. due to crystal frequency disturbance, or FFO estimation error due to interference.

However, in some embodiments, the initiator 1 and/or reflector 2 may also account for one or more other sources of dwell-time delay, which may potentially be variable. These may include generic jitter, known to one or both devices. They may include internal delays in the radio itself, which may vary in dependence on automatic gain control (AGC) settings, or delays in the antenna path. They may include estimates of quantization noise, such as a correction term having a higher temporal resolution than a sampling clock of the initiator 1 or reflector 2. They may include intentional variations in the dwell times between successive steps, introduced by the reflector 2 for security purposes (e.g. in accordance with a pseudo-random dither sequence known only to the initiator 1 and reflector 2).

Initiator

Within each ranging calibration step m=1, . . . , M, the initiator 1 measures the average frequency, $\bar{f}_R(m)$, of the unmodulated carrier sent by the reflector 2 over the step, relative to the initiator's oscillator. The initiator 1 uses each measurement to calculate an estimate, $\widehat{FFO}_R(m)$, of fractional frequency offset for the respective calibration step, by treating the initiator's oscillator as reference frequency, $f_0$, such that:

$$\widehat{FFO}_R(m) = \frac{\bar{f}_R(m) - f_0(m)}{f_0(m)}.$$

If the initiator 1 has received a valid SYNC packet within any calibration step, with a received signal strength greater than −70 dBm, the initiator 1 measures the fractional frequency offset to within 1 ppm accuracy. So long as the reflector's FFO, with respect to an ideal time reference, does not vary by more than 1 ppm, then the values of $\widehat{FFO}_R{}_R(m)$ should not vary more than 1 ppm.

The initiator 1 is configured to transmit a SYNC packet in each calibration step, having a time-of-departure of $ToD_I[m]$. However, before each transmission, the initiator 1 adjusts each $ToD_I[m]$ based on the nominal times-of-arrival of each SYNC packet since the start of the event to generate an "anchor" $tAnc_I$, for the event. This is done so that the SYNC packet is received at the reflector 2 at the nominal time. Each anchor value that is calculated by the initiator 1 represents a timing error within the initiator 1 itself. The set of nominal anchors is denoted as $$tAnc_I \in tAnc_I^{nom} = \{ToD_I[m] - t_{I,TX,MC,nom}^{1,p[m]}[m],$$
$$m=1,\ldots,M\}$$

In preferred embodiments, the range of the set $tAnc_I^{nom}$ should not exceed 0.125 µs.

The initiator 1 is configured to estimate times-of-arrival at its antenna of each received SYNC packet within each calibration step. Denote the recorded value as $\widehat{ToA}_I[m]$. From the M calibration steps, the initiator 1 calculates up to M coarse estimates of the round-trip time $\widehat{RTT}(m)$. From these estimates of the round-trip time, the initiator 1 adjusts its future timing calculations to accommodate the time-of-flight between devices, as explained below. The time-of-flight is not necessarily constant for each frequency due to environmental effects (e.g. due to multipath, antenna group-delay variation).

For each calibration step, the initiator 1 is preferably configured to measure the round-trip time, relative to the start of the event, to an accuracy of 025 µs when the received signal power is ≥−70 dBm.

The reflector 2 may deviate from the ideal dwell-time due to quantization effects. However, the dwell-time is preferably within 0.25 µs of the nominal value. Thus, given that, on any frequency, the initiator 1 is preferably able to estimate the observed round-trip time to an accuracy of 0.25 µs and the reflector dwell-time is within 0.25 µs of the nominal value, the total error in the round-trip time measurement due to device inaccuracy is at most 0.5 µs. The round-trip time is given by RTT=2ToF+Dwell time and so the error in the ToF estimate due to device error should be at most 0.25 µs in such embodiments.

Note that the fractional frequency offset also affects the dwell-time. For example, for a 100 ppm offset with a 400 µs dwell-time the dwell-time is modified by $100^{-6}*400^{-6}=40$ ns. However, the FFO is preferably known to within 2 ppm, and thus the dwell offset should be only 0.8 ns in this case and has negligible effect from a timing perspective.

Each $ToA_I[m]$ is corrected by the nominal time-of-arrival of the respective SYNC packet, and the round-trip time, since the start of the event, to generate an anchor $tAnc_{I,TX}$ for the event. The set of nominal anchors is denoted as $$tAnc_{I,TX} \in tAnc_{I,TX} = \{ToA_I[m] - t_{R,TX,MC,nom}^{1,p[m]} - ToF[m], m=1,\ldots,M\}$$

where $$ToF[m] = \frac{1}{2} R\hat{T}T(m).$$

The initiator 1 adjusts the transmission times of each ranging-stage data packet it sends to ensure that the latest start time of the transmission of each unmodulated carrier, measured at the antenna of the initiator 1, satisfies $$t_{I,TX,UC}^{1,p}[k] \leq \frac{t_{I,TX,UC,nom}^{1,p}[k]}{1 + FFO + 1ppm} - tAnc_I - 0.25\,\mu s,$$

$$\forall\, tAnc_I \in tAnc_I,$$

$$\forall\, FFO \in FFO_I.$$

The set, $FFO_I$, here represents the fractional frequency offsets of the reflector 2 over the steps m. The initiator 1 uses $\widehat{FFO}_R(m)$, which are measured relative to its own oscillator, as estimates of $FFO_I$, in order to calculate transmission times that satisfy this inequality.

This inequality results in each transmission starting cautiously early, based on a worst-case assumption of the largest relative fractional frequency offset and the longest transit delay represented in $tAnc_I$.

In operation, the initiator 1 can calculate transmission times by:

i) determining and storing a set of anchor values $tAnc_{I,TX}$ from the times of arrival of the calibration steps, m, and the coarse time-of-flight estimates, as above;

ii) comparing the anchors values in $tAnc_{I,TX}$ to identify a maximum, $tAnc_I$;

iii) estimating $\widehat{FFO}_R(m)$ over the calibration steps, m;

iv) comparing the values $\widehat{FFO}_R(m)$ to identify a maximum, FFO;

v) accessing data representing a transmission schedule to determine the nominal transmission time, $t_{I,TX,UC,nom}^{1,p}[k]$, for each ranging step, k;

vi) using these values to evaluate the right side of the inequality above for each ranging step, k;

vii) selecting transmission times for the ranging steps that are equal to (or earlier) than these values.

The initiator 1 also similarly adjusts the duration of each ranging-stage data packet that it transmits to ensure that the earliest end time of each transmission of an unmodulated carrier, measured at the antenna of the initiator 1, satisfies $$t_{I,TX,UC}^{2,p}[k] \geq \frac{t_{I,TX,UC,nom}^{2,p}[k]}{1 + FFO - 1ppm} - tAnc_I + 0.25\,\mu s,$$

$$\forall\, tAnc_I \in tAnc_I,$$

$$\forall\, FFO \in FFO_I.$$

This inequality results in each transmission ending cautiously late, based on a worst-case assumption of the largest negative fractional frequency offset from $FFO_I$ and the shortest transit delay represented in $tAnc_I$. The initiator 1 may implement this by ending the transmission at times exactly at (or later than) the times given by the right side of this inequality.

The value of $t_I^{anchor}$ is internal to the initiator device 1 and does not need to be sent to the peer reflector device 2.

The inclusion of the ±1 ppm and 0.25 μs terms is to account for an allowed peer variation and a lower bound on the environmental tolerance, which in this example require that:

the reflector's FFO has a stability within 1 ppm between calibration packets;

the reflector's dwell-time jitter in the calibration packets is at most 0.375 μs; and the ToF variation across frequencies is at most 0.125 μs.

In other embodiments, these values may be specified differently.

The initiator 1 thus preferably over-sizes its transmission sufficiently, compared with a nominal specification, to provide enough margin for its own sources of error, arising from:

FFO estimation error, e.g. 1 ppm

ToA estimation error, e.g. 0.125 μs resolution of step timing adjustment to account for FFO offset (e.g. 1 μs)

signal delay variation (e.g. antenna, match and radio group delay).

To compensate for this the initiator 1 may increase the bounds accordingly, so that:

$$t_{I,TX,UC}^{1,p}[k] \leq \frac{t_{I,TX,UC,nom}^{1,p}[k]}{1 + FFO + 2ppm} - tAnc_I - 0.375\,\mu s + T_{I,RX,int,LL},$$

$$\forall\, tAnc_I \in tAnc_I,$$

$$\forall\, FFO \in FFO_I$$

$$t_{I,TX,UC}^{2,p}[k] \geq \frac{t_{I,TX,UC,nom}^{2,p}[k]}{1 + FFO - 2ppm} - tAnc_I + 0.375\,\mu s + T_{I,RX,int,UL},$$

$$\forall\, tAnc_I \in tAnc_I,$$

$$\forall\, FFO \in FFO_I$$

where $T_{I,RX,int,UL}$ and $T_{I,RX,int,LL}$ represent predetermined upper and lower limits on the internal delay within the initiator's radio.

The initiator 1 may further be configured so that the latest start time of the transmission of a modulated carrier, measured at the antenna, of all modulated carriers, satisfies $$\left| ToD_I[k] - \left( \frac{t_{I,TX,MC,nom}^{1,p}[k]}{1 + FFO} - tAnc_I - ToD_{I,dith}[k] \right) \right| < 0.125\,\mu s$$

$$\forall\, tAnc_I \in tAnc_I,$$

$$\forall\, FFO \in FFO_I.$$

where $\text{ToD}_{1,\text{dith}}[k]$ is a predetermined dither term, e.g. implemented for security purposes, that may be known and corrected for in the round-trip-time measurement. The absolute value of $\text{ToD}_{1,\text{dith}}[k]$ may, in some embodiments, be 0.5 μs.

For systems 10 that use a multiple antenna system, the reflector 2 and initiator 1 may be configured to provide a guard period between unmodulated carriers to ensure that the oversized unmodulated carriers do not overlap. This guard period may also include sufficient time for an antenna to switch between ports. It may also include sufficient time to ramp up and down the power of the transmitted signal, if spurious emissions were to be caused by switching.

For systems 10 that support the initiator 1 performing ranging event with multiple reflector devices 2 simultaneously, the transmission between initiator-reflector pairs may be interleaved (i.e. time-multiplexed), or the initiator 1 may broadcast to multiple reflectors. In such systems 10, it may be challenging for the initiator 1 to match the timing frequency of multiple reflector devices 2 having varying fractional frequency offsets. Thus, in some embodiments, each reflector 2 may be configured to synchronize with the initiator 1. This may be done by adapting the approach above accordingly.

It will be appreciated by those skilled in the art that the invention has been illustrated by describing various specific embodiments thereof, but is not limited to these embodiments; many variations and modifications are possible, within the scope of the accompanying claims.

The invention claimed is:

1. A method for synchronizing communications in a radio ranging process, the method comprising:
   transmitting a succession of calibration signals by radio to a first radio device from a second radio device according to a predetermined schedule of nominal transmission times;
   determining a plurality of timing offsets for the first radio device and the second radio device, wherein each timing offset is determined by subtracting i) a nominal transmission time for a respective calibration signal of the succession of calibration signals from ii) a time of arrival at the first radio device of the calibration signal, whereby the timing offset represents a time-of-flight for the respective calibration signal plus any transmission delays;
   identifying a largest timing offset in the plurality of timing offsets for the first radio device and the second radio device;
   determining a start time for a transmission of an unmodulated-carrier ranging signal by the first radio device by using the identified largest timing offset to adjust a nominal start time for the transmission of the unmodulated-carrier ranging signal to determine a start time for the transmission that is earlier than the nominal start time by an amount at least as large as the largest timing offset in the plurality of timing offsets; and
   transmitting the unmodulated-carrier ranging signal from the first radio device at the determined start time.

2. The method of claim 1, further comprising:
   determining an end time for the transmission of the unmodulated-carrier ranging signal by the first radio device, by processing the plurality of timing offsets and data representative of a nominal end time for the transmission of the unmodulated-carrier ranging signal to determine an end time for the transmission that is not earlier than the nominal end time by more than a smallest timing offset in the plurality of timing offsets; and
   ceasing transmitting the unmodulated-carrier ranging signal from the first radio device at the determined end time.

3. A radio device configured to:
   receive a succession of calibration signals transmitted by radio to the radio device, according to a predetermined schedule of nominal transmission times, by a second radio device;
   determine a plurality of timing offsets for the radio device and the second radio device, wherein each timing offset is determined by subtracting i) a nominal transmission time for a respective calibration signal of the succession of calibration signals from ii) a time of arrival at the radio device of the calibration signal, whereby the timing offset represents a time-of-flight for the respective calibration signal plus any transmission delays;
   identifying a largest timing offset in the plurality of timing offsets for the radio device and the second radio device;
   determine a start time for a transmission of an unmodulated-carrier ranging signal by the radio device by using the identified largest timing offset to adjust a nominal start time for the transmission of the unmodulated-carrier ranging signal to determine a start time for the transmission that is earlier than the nominal start time by an amount at least as large as the largest timing offset in the plurality of timing offsets; and
   transmit the unmodulated-carrier ranging signal at the determined start time.

4. The radio device of claim 3, further configured to:
   determine an end time for the transmission of the unmodulated-carrier ranging signal by the radio device, by processing the plurality of timing offsets and data representative of a nominal end time for the transmission of the unmodulated-carrier ranging signal to determine an end time for the transmission that is not earlier than the nominal end time by more than a smallest timing offset in the plurality of timing offsets; and
   cease transmitting the unmodulated-carrier ranging signal from the radio device at the determined end time.

5. The radio device of claim 3, configured to compensate for an internal delay within radio transmission circuitry of the radio device when determining the start time for the transmission.

6. The radio device of claim 3, wherein the radio device comprises a correlator or symbol detector, and is configured to receive modulated calibration signals and to use the correlator or symbol detector to determine a time of arrival of each calibration signal.

7. The radio device of claim 3, configured to:
   determine a respective start time for each of a succession of transmissions of unmodulated-carrier ranging signals by the radio device; and
   transmit the succession of unmodulated-carrier ranging signals at the determined start times.

8. The radio device of claim 3, configured to determine the start time as a predetermined function of at least the nominal start time and a largest timing offset in the plurality of timing offsets.

9. The radio device of claim 3, configured to subtract, from the nominal start time, a largest timing offset of the plurality of timing offsets plus a constant timing jitter value, when determining the start time.

10. The radio device of claim 3, configured to determine the start time in further dependence on a fractional-frequency-offset factor.

11. The radio device of claim 3, configured to determine a start time for receiving a ranging signal from the second radio device, by processing the plurality of timing offsets and data representative of data representative of a nominal start time for the reception of the ranging signal to determine a start time that is later than the predetermined nominal start time by at least the largest timing offset in the plurality of timing offsets.

12. The radio device of claim 11, further configured to determine an end time for receiving the ranging signal using the identified largest timing offset to adjust a nominal end time for the reception of the ranging signal to determine an end time that is earlier than the nominal end time by an amount at least as large as the largest timing offset in the plurality of timing offsets.

13. A radio ranging system comprising the radio device according to claim 3 and further comprising said second radio device.

14. The radio ranging system of claim 13, wherein the second radio device is configured to:
receive a succession of unmodulated-carrier ranging signals from the radio device; and
use the succession of unmodulated-carrier ranging signals to determine a range value representative of a distance between the radio device and the second radio device.

15. The radio ranging system of claim 13, wherein:
the radio device is configured to be a reflector device;
the second radio device is configured to be an initiator device; and
the radio device is configured to transmit the unmodulated-carrier ranging signal as a ranging response signal in response to receiving a ranging signal from the second radio device.

16. The radio ranging system of claim 13, wherein:
the radio device is configured to be an initiator device;
the second radio device is configured to be a reflector device; and
the second radio device is configured to transmit a ranging response signal in response to receiving the unmodulated-carrier ranging signal from the radio device.

17. A radio device configured to:
transmit a plurality of calibration signals by radio to a second radio device;
receive a plurality of calibration response signals from the second radio device;
determine a plurality of time-of-flight values for the radio device and the second radio device, wherein each time-of-flight value is determined in dependence on a time of departure of a respective calibration signal and a time of arrival of a respective calibration response signal;
identify a largest time-of-flight value of the plurality of time-of-flight values for the radio device and the second radio device;
determine a start time for a transmission of a ranging signal by the radio device by using the identified largest time-of-flight value to adjust a nominal start time for the transmission of the ranging signal to determine a start time for the transmission that is earlier than the nominal start time by an amount at least as large as the largest time-of-flight value in the plurality of time-of-flight values;
transmit a ranging signal to the second radio device at the determined start time;
receive a ranging response signal from the second radio device; and
process the ranging response signal to determine a range value representative of a distance between the radio device and the second radio device.

18. The radio device of claim 17, wherein the ranging signal comprises an unmodulated carrier signal, and wherein the radio device is configured to determine the range value using phase-based ranging.

19. A radio ranging system comprising the radio device according to claim 17, and further comprising said second radio device.

* * * * *